United States Patent [19]
Deutsch

[11] Patent Number: 5,754,109
[45] Date of Patent: May 19, 1998

[54] MAGNETIC COIN BOX SENSOR

[75] Inventor: Brian M. Deutsch, Maple Valley, Wash.

[73] Assignee: Foursum International, Inc., Kent, Wash.

[21] Appl. No.: 663,912

[22] Filed: Jun. 14, 1996

[51] Int. Cl.$^6$ .................................................. G08B 13/14
[52] U.S. Cl. .......................... 340/568; 340/571; 340/551; 379/145; 379/451
[58] Field of Search ..................................... 340/568, 571, 340/572, 547, 551; 379/145, 144, 146, 451, 437; 200/61.71, 61.72, 61.73, 61.74, 61.75; 335/112, 117, 177, 180, 181, 183

[56] References Cited

U.S. PATENT DOCUMENTS

| | | | |
|---|---|---|---|
| 4,123,623 | 10/1978 | McElliott | 340/568 X |
| 4,723,118 | 2/1988 | Hooley et al. | 340/568 |
| 4,780,704 | 10/1988 | Tommasini | 340/572 |
| 4,928,299 | 5/1990 | Tansky et al. | 379/39 |
| 5,554,833 | 9/1996 | Johnson | 200/61.72 |

*Primary Examiner*—Jeffery Hofsass
*Assistant Examiner*—Anh La

*Attorney, Agent, or Firm*—Glenn D. Bellamy; Kathleen T. Petrich

[57] ABSTRACT

A sensor that senses the absence of a high-magnetic permeable coin box (10) that, in its quiescent state, is mounted within a compartment (12) of a coin operated device, such as a pay telephone (14). The compartment has at least one interior surface (16). The sensor includes an electromagnetic switch (20) having two states (open circuit, closed circuit) that affect a signal to an output device (22) when the switch (20) is activated from one state to another. In preferred form, the switch (20) is a reed switch. A magnet (18) normally provides magnetic flux flow to the switch. When the magnetic flux flow is disrupted, the switch (20) changes from one state to another. The switch (20) and the magnet (18) are fixably-connected to at least one surface (16) of the compartment (12). The combination of the magnet (18) and the switch (20) are positioned within the compartment relative to the coin box (10), such that when the coin box (10) is in its quiescent state, the presence of the coin box disrupts the magnetic flux flow from the magnet (18) to the switch (20). In this quiescent state, the switch is in one state. When the coin box is removed, the magnetic flux flow is no longer disrupted and the switch changes to the other state. A signal is sent to the output device (22) from the switch (20) when the switch (20) changes state.

6 Claims, 2 Drawing Sheets

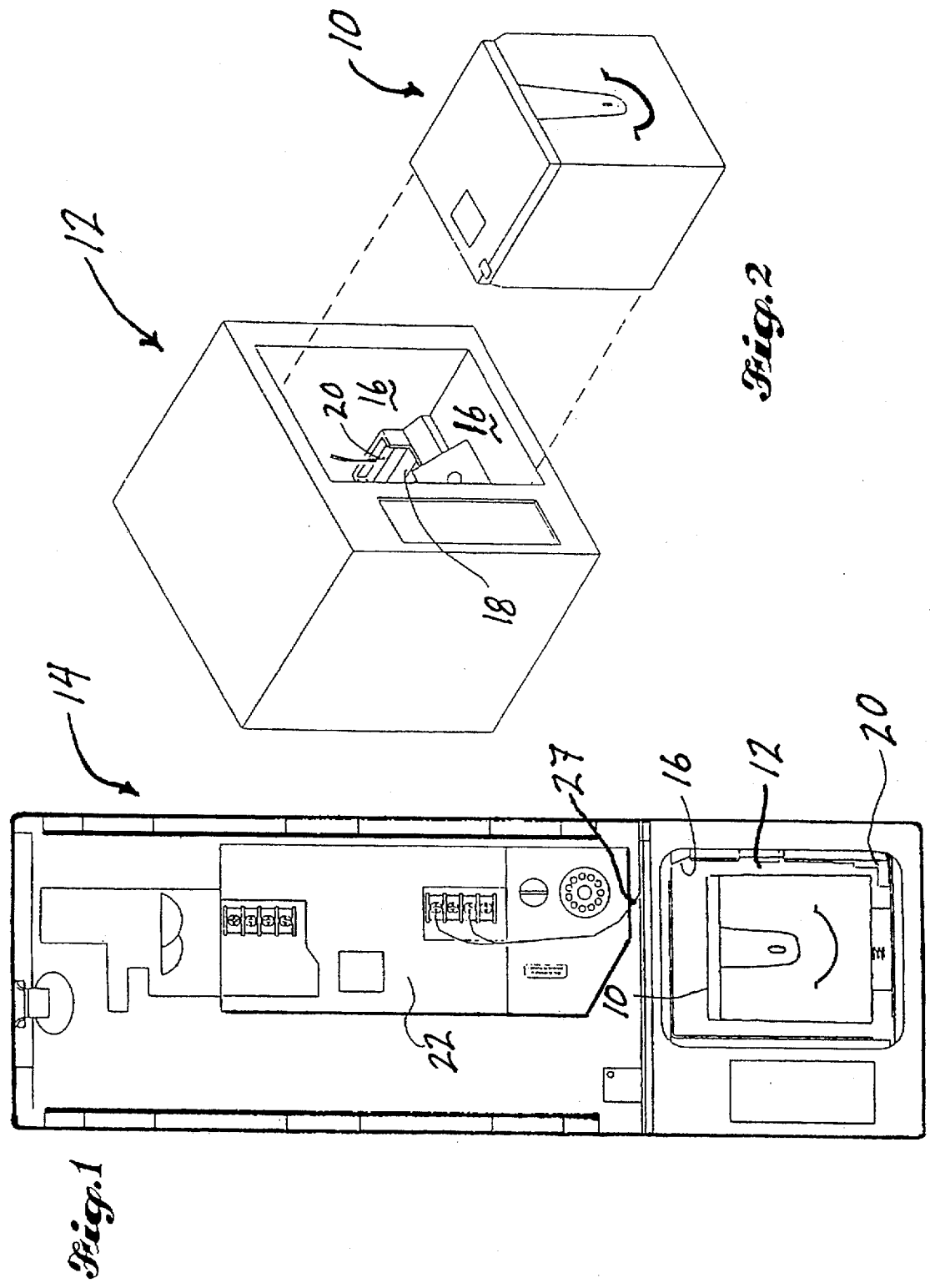

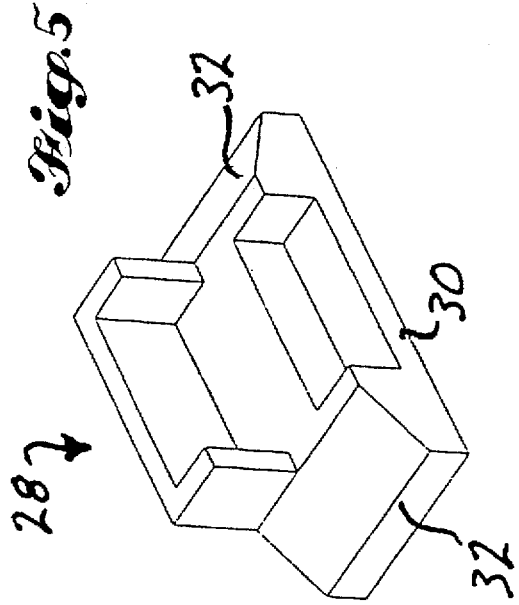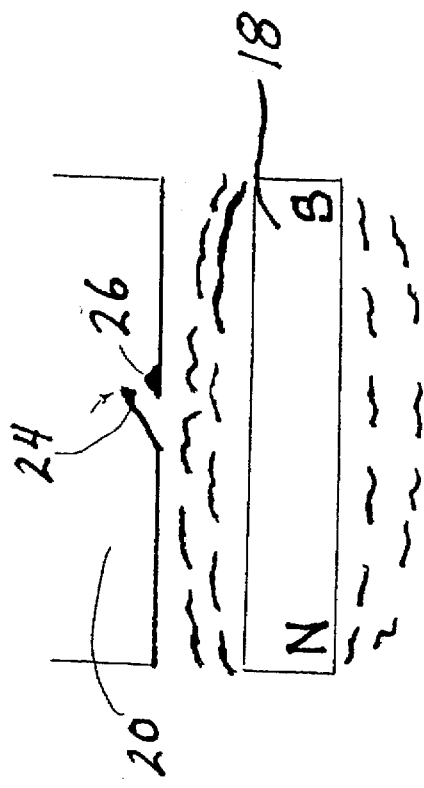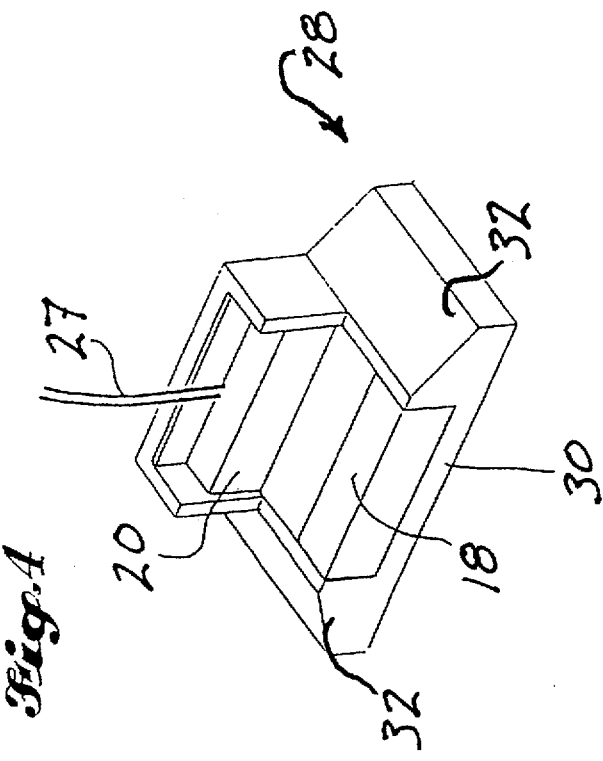

MAGNETIC COIN BOX SENSOR

TECHNICAL FIELD

The present invention relates to coin-operated devices. More specifically, the invention relates to a sensor that senses the absence of a coin box in a coin-operated device such as a pay telephone.

BACKGROUND OF THE INVENTION

Presently, the absence of a coin box in a coin-operated device, such as a pay telephone, may be sensed mechanically via a snap-action limit switch. These mechanical switches are easily damaged and unreliable. Other means for detecting the coin box require electrical power in order to function, such as Hall Effect, capacitive, or optical sensors. Typical magnetic proximity sensors require a magnet to be placed on the coin box to actuate it.

An object of the present invention uses the coin box, itself, to disrupt the normal magnetic flux flow that activates an output device to alert appropriate personnel of the absence of the coin box.

DISCLOSURE OF THE INVENTION

The present invention provides a sensor that senses the absence of a high-magnetic permeable coin box that, in its quiescent state, is mounted within a compartment of a coin-operated device such as a pay telephone. The compartment has at least one interior surface. The sensor includes an electromagnetic switch having two states that sends a signal to an output device when the switch changes from one state to the other state. A magnet is positioned relative to the switch. The magnet normally provides magnetic flux flow to the switch. When the magnetic flux flow is disrupted, the switch changes from one state to the other state. The switch and the magnet are fixedly-connected to at least one surface of the compartment. The combination of the magnet and the switch is positioned within the compartment relative to the coin box such that, when the coin box is in its quiescent state, the coin box disrupts the magnetic flux flow to the switch. The switch is activated to one state, affecting a quiescent state signal to the output devise. During removal of the coin box from the compartment, such that the coin box is no longer in its quiescent state, the absence of the coin box no longer disrupts the magnetic flux flow to the switch. This activates the switch to its other state and affects a signal to the output device.

In preferred form, the magnet and switch are fixedly-attached to at least one low-magnetic permeable buffer that is fixedly-attached to at least one surface of the compartment. The buffer is preferably a bracket having an L-shaped base and a pair of chamfered wings on both sides of the base.

Also in preferred form, the switch is a reed switch, although other magnetically activated switches may be used.

The sensor signals an output device that may be an electronically controlled chassis, an alarm, or the like. The output may be recorded and sent to a printer for a permanent record of the output.

These and other advantages, objects and features will become apparent from the following best mode description, the accompanying drawing, and the claims, which are all incorporated herein as part of the disclosure of the invention.

BRIEF DESCRIPTION OF THE DRAWINGS

Like reference numerals are used to designate like parts throughout the several views of the drawing, wherein:

FIG. 1 is a front view of a pay telephone, shown without the front cover, having a compartment for a coin box, an electromagnetic switch and a magnet, output from the switch is sent to a chassis;

FIG. 2 is an exploded pictorial view of the coin box shown outside the compartment, and showing the magnet and switch mounted in a buffer that is mounted within the compartment;

FIG. 3 is a schematic view of the reed switch and the magnet;

FIG. 4 is a pictorial view of the magnet and switch mounted in the L-shaped bracket; and FIG. 5 is a pictorial view of the L-shaped bracket.

BEST MODE FOR CARRYING OUT THE INVENTION

Because coin-operated devices are usually unattended, they are, by their nature, an irresistible challenge to vandals and/or thieves. Thus, it is important to be able to sense when the coin box has been removed. The present invention addresses an inexpensive and mechanically-reliable sensor that senses the absence of the coin box mounted within a compartment of a coin operated device, especially a pay telephone.

Referring to FIGS. 1 and 2, a high-magnetic permeable coin box 10, such as steel, is mounted within a compartment 12 of a pay telephone 14 in its normal quiescent state. The compartment 12 has at least one interior surface 16, although in preferred form there are five interior surfaces: a right side, a left side, and top side, and bottom side, and a back side, (better shown in FIG. 2). Normally, a front cover (not shown) covers the compartment 12 such that, generally, only authorized personnel have access to the coin box 10.

Referring also to FIGS. 3 and 4, fixedly-connected to at least one surface 16 a magnet 18 and an electromagnetic switch 20 having two states (open circuit, closed circuit) that affects a signal to an output device 22 when the switch 20 changes states. The magnet 18 is positioned relative to the switch 20 such that the magnet 18 provides magnetic flux flow (schematically shown in FIG. 3) to activate switch 20.

Switch 20 is preferably a reed switch. Reed switch 20 includes two contacts 24, 26 that is either normally closed or normally open in the presence of magnetic flux flow. In the presence of a high magnetic permeable object, such as the coin box, there is not enough residual magnetic flux flow to operate the switch. Thus, the switch changes state by either opening or closing the contacts, depending on the switches normal operating state. The switch includes a pair of leads 27 that provide a signal to output device 22.

Reed switch is glass enclosed and hermetically sealed. The reed switch is an off-the-shelf item, such as made by Amseco, catalog number 507-AMS-106. However, other switches may also be used. The magnet is also a standard off-the-shelf bar type magnet. The preferred embodiment also uses an Amseco magnet.

Although a reed switch has electromagnetic movable properties within the switch itself, the switch does not move relative to anything else. This is a key feature of this invention. Both the magnet and the switch are stationary. It is only the presence of the coin box that disrupts magnetic flux flow, and activates the switch. This disruption affects the signal to the output device.

Referring again to FIGS. 2–4, the combination of the magnet 18 and the switch 20 are positioned such that the presence of the coin box disrupts magnetic flux flow that exists between the magnet 18 and the switch 20. The preferred positioning of the magnet relative to the switch is that the magnet is parallel to the switch and about ½ inch apart.

In the coin box's quiescent state, the presence of the coin box positioned relative to the magnet provides little residual magnetic flux flow to the switch. Hence, the switch is unactivated. Once the coin box is removed, magnetic flux flow is no longer disrupted, and residual magnetic flux flow is restored to the switch. The switch is now activated. The resulting change in state, whether normally closed or normally open, sends a signal to the output device.

Referring to FIGS. 4 and 5, if the compartment 12 is comprised of a high-magnetic permeable material, such as steel, then the switch 20 and magnet 18 combination must be either physically distanced from the magnetic properties of the container surfaces 16 or buffered by a low or non-magnetic permeable material, such as plastic. Buffer 28 is a mounting bracket that buffers the magnet 18 and switch 20 combination from any high magnetic permeable properties that the container surfaces might have. In addition, buffer 28 may be used to aid in positioning the magnet/switch combination within the compartment. In preferred form, buffer 28 is an L-shaped bracket having an L-shaped base 30 and a pair of wings 32 on each side of the base 30. Wings 32 are chamfered to assist proper repositioning of the coin box 10 when replaced into its compartment. However, buffer 28 may be formed of any low or non-magnetic permeable material impeding any unwanted magnetic flux flow. If the container surfaces are of sufficiently low magnetic permeability that the magnet is not attracted to surface 16, a buffer is not required.

Placement of the buffer 28 with the magnet and switch combination is preferred to be in the bottom corner of the compartment, as shown in FIG. 2. Although the placement of the buffer with the magnet and the switch combination may be anywhere along one of the surfaces 16, the preferred placement is in the back corner to defeat any potential vandalism, and assist in coin box repositioning.

The output device 22 is, preferably, an electronic chassis, shown in FIG. 1. The chassis may then be monitored by a modem. An alarm, and/or indicating light may be used to signal the switch operating to an activated state (removal of the coin box). Also, the output may be recorded and printed. However, the output can be essentially anything that indicates a change of state.

The illustrated embodiments are only examples of the present invention and, therefore, are non-limitive. It is to be understood than many variations in size, shape and construction may be made to the illustrated and above-described embodiment without departing from the spirit and scope of the present invention. Some of the features of the preferred embodiment may be utilized without other features. Therefore, it is to be understood that the presently described and illustrated embodiment is non-limitive and is for illustration only. Instead, my patent is to be limited for this invention only by the following claims, interpreted according to accepted doctrines of claim interpretation, including use of the doctrine of equivalents and reversal of parts.

What is claimed is:

1. A sensor that senses the absence of a high-magnetic permeable coin box that in its quiescent state is mounted within a compartment of a coin operated device, said compartment having at least one interior surface, said sensor comprising:

an electromagnetic switch having two states that affect a signal to an output device when the switch is activated from one state to another;

a magnet that is positioned relative to the switch, said magnet normally providing magnetic flux flow to the switch, wherein when the magnetic flux flow is disrupted to the switch, the switch changes from one state to the other state; and said switch and said magnet stationarily-connected to at least one surface of the compartment, wherein the combination of the magnet and the switch is positioned within the compartment, such that the presence of the coin box, in its quiescent state, disrupts magnetic flux flow to the switch, activating the switch to one state and thereby affecting a quiescent state signal to the output device;

wherein removal of the coin box from the compartment, such that the coin box is no longer in its quiescent state, absence of the coin box no longer disrupts magnetic flux flow to the switch, activating the switch to the other state; and thereby affecting a signal to the output device.

2. The sensor according to claim 1, wherein the magnet and the switch are fixedly-attached to at least one low-magnetic-permeable buffer that is fixedly-attached to at least one surface of the compartment.

3. The sensor according to claim 2, wherein the buffer has an L-shaped base having a pair of chamfered wings on both sides of the base.

4. The sensor according to claim 1, wherein the switch is a reed switch.

5. The sensor according to claim 1, wherein the output device is an electronically controlled chassis.

6. The sensor according to claim 1, wherein the output device includes an alarm.

* * * * *